United States Patent
Noirot

(12) 
(10) Patent No.: US 6,739,103 B1
(45) Date of Patent: May 25, 2004

(54) CENTRIFUGALLY CAST HOLLOW STRAIGHT SIDED FIBERGLASS REINFORCED COLUMNS

(75) Inventor: Nicholas N. Noirot, Fairview, PA (US)

(73) Assignee: CW Ohio, Inc., Conneaut, OH (US)

( * ) Notice: Subject to any disclaimer, the term of this patent is extended or adjusted under 35 U.S.C. 154(b) by 0 days.

(21) Appl. No.: 10/262,779

(22) Filed: Oct. 1, 2002

Related U.S. Application Data

(62) Division of application No. 09/891,835, filed on Jun. 26, 2001, now Pat. No. 6,491,856.

(51) Int. Cl.[7] .............................. E04C 1/00; E04C 3/30
(52) U.S. Cl. ..................... 52/309.1; 52/736.1; 52/737.6
(58) Field of Search ............................ 52/309.1, 731.2, 52/731.4, 732.1, 736.1, 736.3, 736.4, 737.4, 737.6

(56) References Cited

U.S. PATENT DOCUMENTS

| | | | | |
|---|---|---|---|---|
| 726,801 A | * | 4/1903 | Maxwell | 138/115 |
| 1,552,300 A | * | 9/1925 | Hersey | 52/184 |
| 1,917,365 A | * | 7/1933 | Geortz | 52/282.3 |
| 2,824,342 A | * | 2/1958 | Hoyle | 52/726.4 |
| 3,741,707 A | | 6/1973 | Baumann et al | |
| 4,113,823 A | | 9/1978 | Iida | |
| 4,358,264 A | | 11/1982 | Yamamoto et al. | |
| 4,383,965 A | | 5/1983 | Rother et al. | |
| 4,407,106 A | | 10/1983 | Beck | |
| 4,515,547 A | | 5/1985 | Rother et al. | |
| 4,517,231 A | | 5/1985 | May et al. | |
| 4,738,058 A | * | 4/1988 | Svensson | 52/98 |
| 5,266,260 A | | 11/1993 | Hentschel | |
| 5,309,687 A | * | 5/1994 | Walston | 52/187 |
| 5,356,354 A | * | 10/1994 | Owens | 482/35 |
| 5,667,744 A | | 9/1997 | Valle et al. | |
| 5,874,016 A | | 2/1999 | Bacon, Jr. et al. | |
| 5,881,530 A | * | 3/1999 | Dykmans | 52/745.2 |
| 6,060,006 A | | 5/2000 | Savenok | |
| 6,224,953 B1 | * | 5/2001 | Johnson | 428/20 |
| 6,491,856 B1 | * | 12/2002 | Noirot | 264/259 |
| 2002/0088194 A1 | * | 7/2002 | Ray | 52/439 |

* cited by examiner

Primary Examiner—Carl D. Friedman
Assistant Examiner—Kevin McDermott
(74) Attorney, Agent, or Firm—Renner, Otto, Boisselle & Sklar, LLP

(57) ABSTRACT

A centrifugally cast hollow fiberglass reinforced plastic (FRP) column having angled corners and straight sides. Interiorly of the column adjacent each corner are angled corner fillers that have straight angled sides adhered to straight interior wall surfaces of the column adjacent the respective corners. During molding, the corner fillers are supported within the mold with their straight sides in parallel spaced relation to the straight interior walls of the mold adjacent the respective mold corners a distance slightly greater than the desired minimum wall thickness of the column, whereby when the mold is rotated, uncured FRP material within the mold will flow by centrifugal force into engagement with the interior walls of the mold and around the corner fillers into the space between the corner fillers and interior walls of the mold adjacent the respective mold corners to form a column having a substantially uniform FRP wall thickness.

10 Claims, 2 Drawing Sheets

CENTRIFUGALLY CAST HOLLOW STRAIGHT SIDED FIBERGLASS REINFORCED COLUMNS

The present application is a division of U.S. application Ser. No. 09/891,835, filed Jun. 26, 2001, now U.S. Pat. No. 6,491,856, dated Dec. 10, 2002.

FIELD OF THE INVENTION

The present invention relates to centrifugally cast hollow straight sided fiberglass reinforced columns used for example as architectural structures as vertical support members and as ornamentation and to the method of casting such columns.

BACKGROUND OF THE INVENTION

Centrifugally cast fiberglass reinforced columns are typically fabricated by depositing a predetermined amount of uncured fiberglass reinforced plastic (FRP) material in a column mold and then rotating/spinning the mold to cause the uncured FRP material to move outwardly by centrifugal force into engagement with the interior walls of the mold. The mold is continuously rotated until the FRP material has cured sufficiently to permit the column to be removed from the mold.

The exterior shape of the column will generally correspond to the interior contour of the mold. However, the wall thickness of a centrifugally cast FRP multi-sided column is typically not uniform throughout its circumference because of a build up of the FRP material that occurs at the corners of the mold during mold rotation. Accordingly, more FRP material must be used to centrifugally cast a multi-sided column of the desired minimum wall thickness intermediate the corners. Not only does this significantly add to the overall cost of the column, the greater mass of FRP material at the corners results in more shrinkage at the corners during curing causing the sides of the column to become slightly concave instead of straight.

There is thus a need for a centrifugally cast multi-sided FRP column that has straight sides and a substantially uniform wall thickness throughout its circumference. Also there is a need to be able to make such columns at less cost.

SUMMARY OF THE INVENTION

The present invention relates to centrifugally cast multi-sided hollow FRP columns that have a substantially uniform wall thickness throughout their periphery and straight sides. Also, the invention relates to a method of centrifugally casting such columns that minimizes the amount of FRP material required to obtain a desired minimum wall thickness throughout the circumference of the columns. This is accomplished by placing angled corner fillers adjacent the corners of the mold with the angled sides of the corner fillers supported in spaced relation from the adjacent wall surfaces of the mold at the mold corners a distance slightly greater than the desired minimum wall thickness of the columns.

The hypotenuse of the corner fillers is desirably outwardly radiused (i.e., convexly curved) to aid in the flow of the FRP material around the corner fillers and into the space between the corner fillers and adjacent wall surfaces of the mold at the mold corners during mold rotation. Also, the radiused hypotenuse of the corner fillers adds to the stiffness/rigidity of the corner fillers, which must be rigid enough to maintain the desired spacing between the corner fillers and adjacent interior walls of the mold at the mold corners.

The corner fillers are extruded out of a suitable plastic material such as high impact polystyrene to which a wood filler may be added to further increase the rigidity of the corner fillers. The ends of the corner fillers are supported in spaced relation from the interior walls of the mold at the corners by spacer inserts placed in the ends of the mold. These spacer inserts may have protrusions thereon shaped for close sliding receipt into the hollow ends of the corner fillers.

To the accomplishment of the foregoing and related ends, the invention, then, comprises the features hereinafter more fully described and particularly pointed out in the claims, the following description and annexed drawings setting forth in detail certain illustrative embodiments of the invention, these being indicative, however, of but several of the various ways in which the principles of the invention may be employed.

DETAILED DESCRIPTION OF THE INVENTION

Figure 1:
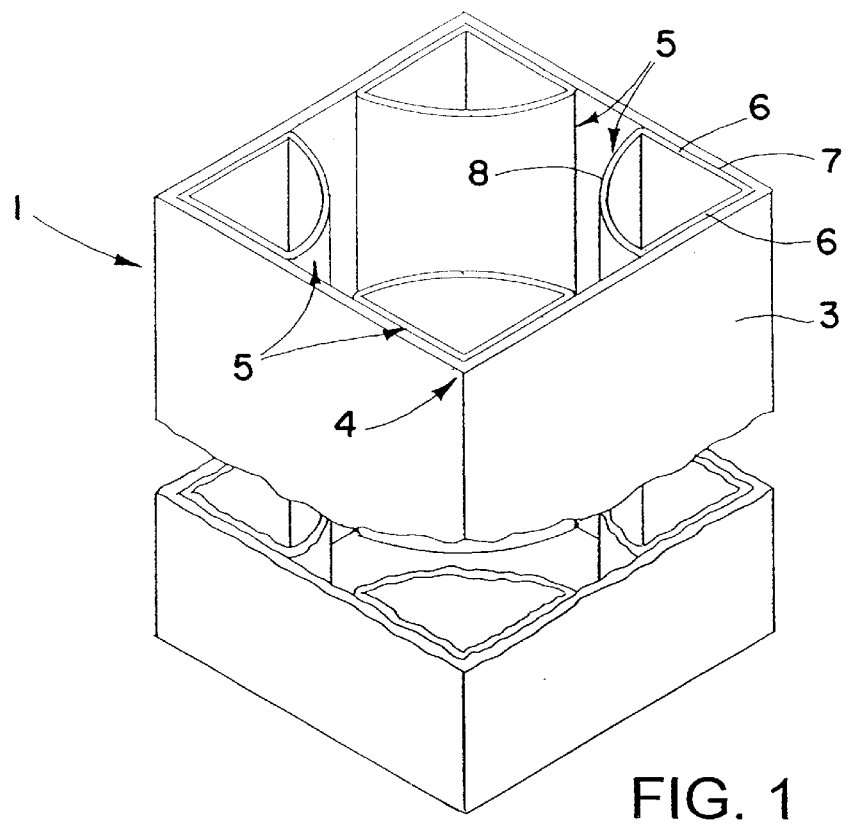
FIG. 1 is a fragmentary schematic perspective view of a square centrifugally cast hollow straight sided column in accordance with the present invention.
Figure 2:
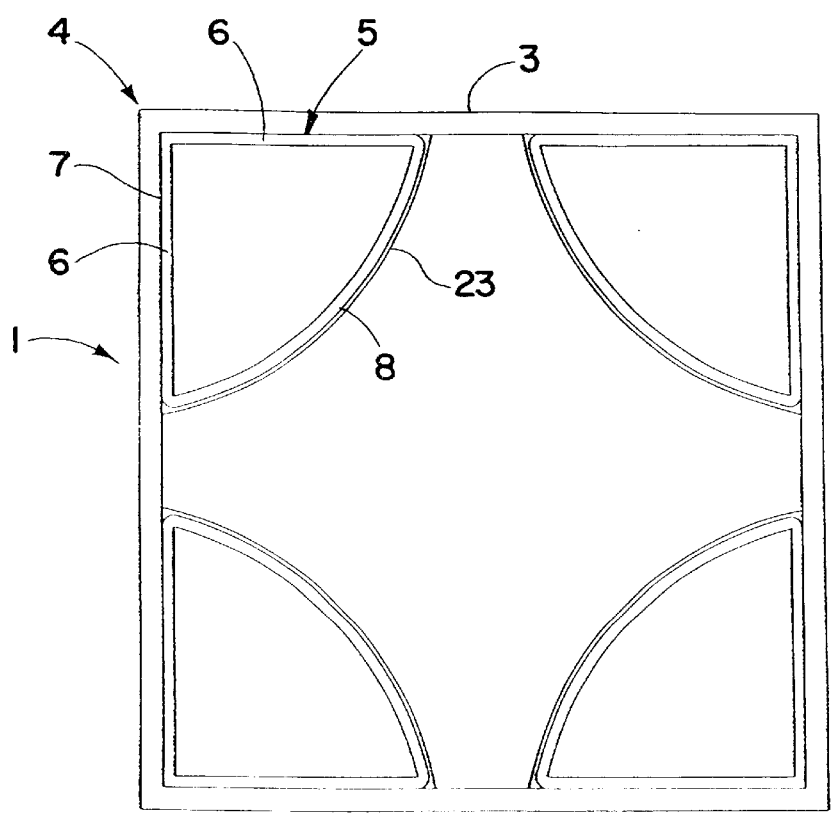
FIG. 2 is an enlarged end view of the column of FIG. 1.

Referring now in detail to the drawings, and initially to FIGS. 1 and 2, there is shown one form of centrifugally cast fiberglass reinforced plastic (FRP) column 1 in accordance with the present invention. Column 1 is hollow and has a substantially uniform wall thickness throughout its periphery and straight sides 3.

Interiorly of the column 1 adjacent each of the corners 4 are right angled column fillers 5 that extend substantially the entire length of the column. These corner fillers 5 may be extruded out of a suitable high impact plastic material such as high impact polystyrene to which a wood filler may be added for increased rigidity. The right angled sides 6 of the corner fillers 5 are adhered to the interior walls 7 of the column adjacent the corners 4. Also, the hypotenuse 8 of the corner fillers 5 is desirably convexly curved to add to their stiffness/rigidity, and to aid in the flow of the FRP material around the corner fillers and into the corners of the mold during centrifugal casting of the column as described hereafter.

Figure 3:
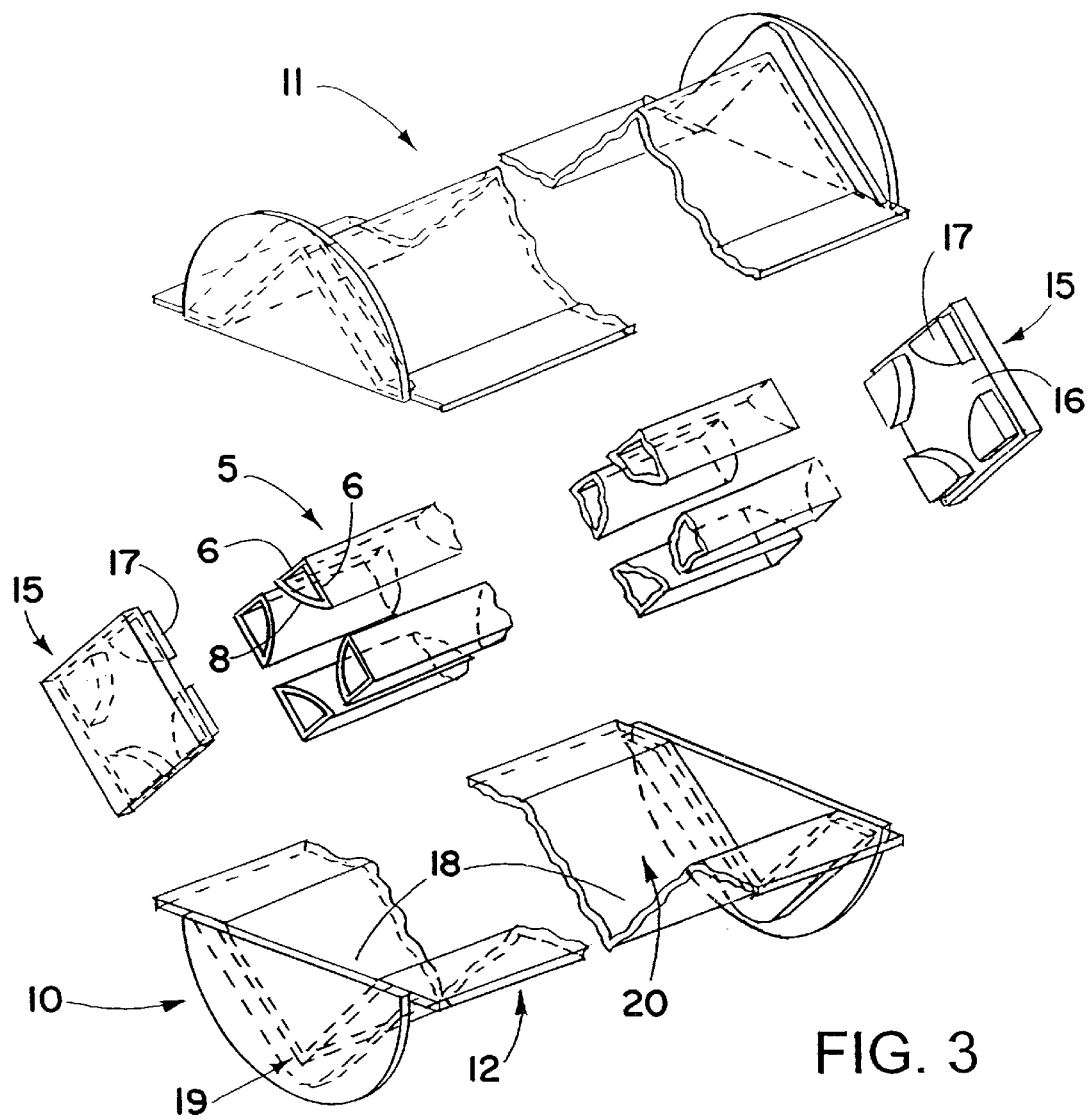
FIG. 3 is an exploded fragmentary schematic perspective view showing two mold halves in the open position and four right angled corner fillers and spacer inserts used to support the corner fillers in spaced relation from the interior walls of a square mold at the corners during centrifugal casting of the column of FIGS. 1 and 2.
Figure 4:
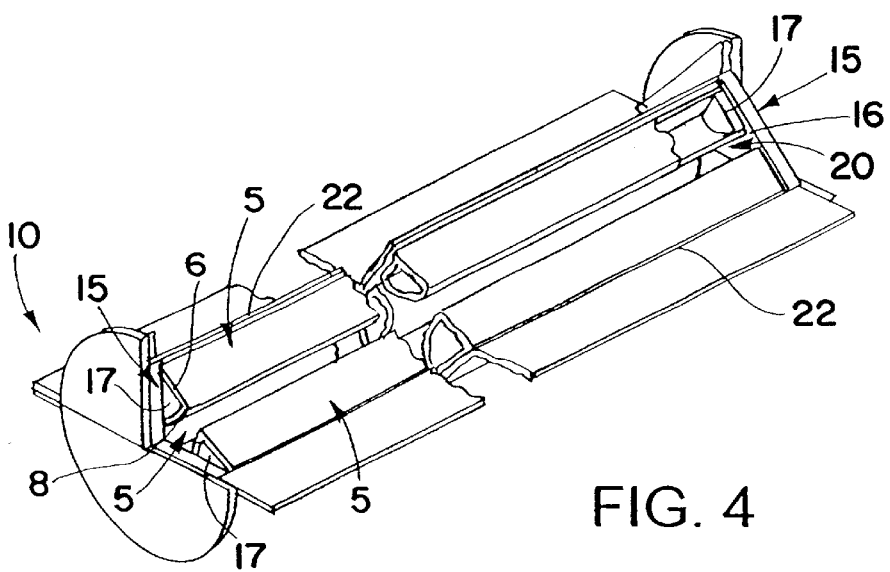
FIG. 4 is a fragmentary perspective view of the mold halves of FIG. 3 in the closed position with portions of the mold and spacer inserts broken away to show the corner fillers supported with the mold.

The dimensions of column 1 may vary as desired, but such column is typically six to ten inches square and eight to twelve feet long and has a uniform wall thickness of approximately one-quarter inch. Column 1 is centrifugally cast in a mold that has interior walls generally corresponding to the exterior shape of the column to be produced, in this case a square column having four straight sides. One such mold 10 is schematically shown in FIGS. 3 and 4. Mold 10 is shown split down the middle at a diagonal to allow the two mold halves 11 and 12 to be opened as schematically shown in FIG. 3 for positioning of the corner fillers 5 in the mold and for removal of the column 1 from the mold after the column has been centrifugally cast.

Each of the corner fillers 5 is supported in the mold 10 only at their ends by spacer inserts 15 placed in the ends of the mold. Inserts 15 are desirably made of a suitable rubber-like material such as silicone rubber that is able to withstand the heat that is generated by the exothermic reaction of the FRP material during curing and to form a fluid tight seal with the ends of the mold. However, if desired these inserts 15 could be made out of a suitable rigid plastic material or metal that is precisely machined to form the required seal at the ends of the mold and will withstand the heat generated by the exothermic reaction.

On one side 16 of the spacer inserts 15 are a plurality of protrusions 17 each shaped for close sliding receipt into the ends of the respective hollow extruded corner fillers 5. These protrusions 17 are positioned and oriented on the spacer inserts 15 to support the angled sides 6 of the corner fillers 5 in parallel spaced relation from the interior walls 18 of the mold 10 adjacent the mold corners 19 a distance slightly greater than the final desired column wall thickness (e.g., one-quarter inch).

The overall length of the mold cavity 20 is somewhat greater than the length of the column 1 to be formed therein in order to accommodate the spacer inserts 15 at opposite ends of the mold. For example, where the spacer inserts are approximately one inch thick, the mold length is approximately two inches longer than the column length (e.g., if the column length is to be eight feet, the mold cavity length is approximately eight feet two inches, and so on).

As previously indicated, the corner fillers 5 are extruded out of a suitable plastic material such as high impact polystyrene. Also, wood fill is desirably added to the polystyrene (or other suitable plastic material) to give the corner fillers added rigidity to enable them to maintain the required spacing between the sides 6 of the corner fillers and the interior corner walls 18 of the mold 10 during the molding operation. These corner fillers will prevent a build up of the FRP material at the corners 19 of the mold during mold rotation. After the corner fillers 5 have been positioned in the mold and the mold has been filled with the requisite amount of FRP material and the mold is closed, the mold is rotated/spun to cause the FRP material to flow outwardly by centrifugal force into engagement with the interior walls of the mold intermediate the mold corners 19 and around the corner fillers 5 and into the space 22 between the corner fillers and mold at the mold corners (see FIG. 4) to completely fill such space thereby substantially eliminating any build up of FRP material at the corners. Because the FRP material is tacky, a light coating 23 (see FIG. 2) of the FRP material will stick to the hypotenuse 8 of the corner fillers which is convexly curved to facilitate flow of the FRP material around the corner fillers and into the space 22. This allows less FRP material to be used to make a column 1 having a given minimum desired wall thickness.

The mold 10 is continuously rotated until the FRP material has sufficiently cured to permit the column 1 to be removed from the mold. Then the mold is stopped and the column 1 and spacer inserts 15 are removed from the mold as a unit and the spacer inserts are removed from the ends of the column for reuse. If the same mold is continuously used to cast additional columns, additional sets of spacer inserts 15 may be alternately used during successive molding operations to give the spacer inserts enough time to cool down between uses.

Because a column 1 made in accordance with the present invention has a substantially uniform wall thickness around its entire periphery (including at the corners), the shrinkage that occurs during curing and subsequent cooling is substantially the same throughout its periphery, whereby the sides of the column are substantially straight rather than concave. Also, eliminating a build up of the FRP material at the corners of the column substantially reduces the amount of FRP material required to make a column of the desired minimum wall thickness. For example, a centrifugally cast eight inch square column having a wall thickness of approximately one-quarter inch and a length of approximately eight feet can be made in accordance with the present invention using approximately sixty-six pounds less FRP material than a conventionally centrifugally cast column of the same nominal dimensions. Also, the cost of making such a column in accordance with the present invention is substantially less despite the added cost of the four corner fillers used in each column, in that the corner fillers are considerably less costly than the FRP material that is eliminated from the column when the corner fillers are used. For example, corner fillers having a wall thickness of approximately one-eighth inch and right angled sides approximately three inches long cost about $0.17 per lineal foot (e.g., about $5.40 for four eight foot long corner fillers needed to make an eight foot long column). The cost savings of eliminating approximately sixty-six pounds of FRP material, on the other hand, is about $20.00. For columns that are shorter or longer, the cost savings would be proportionately less or more.

Although the invention has been shown and described with respect to certain embodiments, it is obvious that equivalent alterations and modifications will occur to others skilled in the art upon the reading and understanding of the specification. In particular, with regard to the various functions performed by the above described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function in the herein illustrated exemplary embodiments of the invention. In addition, while a particular feature of the invention may have been disclosed with respect to only one embodiment, such feature may be combined with one or more other features of other embodiments as may be desired and advantageous for any given or particular application.

What is claimed is:

1. A centrifugally cast hollow fiberglass reinforced plastic (FRP) column having straight sides and angled corners centrifugally cast as one piece with the angled corners and having a substantially uniform FRP wall thickness around the periphery of the column, and hollow angled corner fillers interior of the column adjacent each corner, the corner fillers having angled straight sides adhered to straight interior wall surfaces of the column adjacent the respective corners.

2. The column of claim 1 wherein the corner fillers are hollow plastic extrusions.

3. The column of claim 2 wherein the corner fillers are made of a wood filled plastic material.

4. The column of claim 3 wherein the plastic material is high impact polystyrene.

5. The column of claim 1 wherein the corner fillers have a convexly curved hypotenuse.

6. The column of claim 1 wherein the corner fillers extend substantially the entire length of the column.

7. A centrifugally cast hollow fiberglass reinforced plastic (FRP) column having straight sides and right angled corners centrifugally cast as one piece with the angled corners and having a substantially uniform FRP wall thickness around the periphery of the column, and angled corner fillers interior of the column adjacent each corner, the corner fillers having right angled straight sides adhered to straight interior wall surfaces of the column adjacent the respective corners, the corner fillers being hollow plastic extrusions and extending substantially the entire length of the column.

8. The column of claim 7 wherein the corner fillers have a convexly curved hypotenuse.

9. The column of claim 7 wherein the corner fillers are made of a wood filled plastic.

10. The column of claim 7 wherein the corner fillers are made of a wood filled high impact polystyrene.

* * * * *